United States Patent [19]

Fujii et al.

[11] Patent Number: 5,476,424
[45] Date of Patent: Dec. 19, 1995

[54] VEHICLE POWER TRANSMISSION APPARATUS

[75] Inventors: Takaaki Fujii, Saitama; Kenji Kawaguchi, Tokyo; Toshinari Mohara, Saitama; Kouichi Sugioka, Saitama; Toru Iwadate, Saitama; Seiichi Nishihira, Saitama; Sadashi Yamamoto, Saitama, all of Japan

[73] Assignee: Honda Giken Kogyo Kabushiki Kaisha, Tokyo, Japan

[21] Appl. No.: 138,182

[22] Filed: Oct. 20, 1993

[30] Foreign Application Priority Data

Oct. 20, 1992 [JP] Japan .................... 4-281950

[51] Int. Cl.⁶ .................. B60L 3/00; F16H 59/36
[52] U.S. Cl. .................. 477/15; 477/20; 180/65.8; 318/139; 318/800; 318/811
[58] Field of Search .................. 477/7, 15, 20, 477/44, 107, 110; 180/65.8; 318/139, 800, 801, 811

[56] References Cited

U.S. PATENT DOCUMENTS

| | | | |
|---|---|---|---|
| 3,898,893 | 8/1975 | Hashimoto et al. | 477/15 |
| 4,088,036 | 5/1978 | Hillman | 477/45 |
| 4,630,508 | 12/1986 | Klatt | 477/97 X |
| 4,841,207 | 6/1989 | Cheyne | 318/139 X |
| 4,925,432 | 5/1990 | Miyamaru et al. | 474/8 |
| 5,220,264 | 6/1993 | Yamada | 318/811 X |
| 5,233,280 | 8/1993 | Ghosh | 318/800 |
| 5,355,749 | 10/1994 | Obara et al. | 477/15 X |

FOREIGN PATENT DOCUMENTS

| | | |
|---|---|---|
| 0408074 | 1/1991 | European Pat. Off. . |
| 3-128789 | 5/1991 | Japan . |
| 2030664 | 4/1980 | United Kingdom . |

OTHER PUBLICATIONS

IEEE Transcations on Vehicular Technology, vol. VT-27, No. 3, Aug. 1978, pp. 132–137, Thompson, "Advanced Electronic Control Systems for Electric Vehicles".

*Primary Examiner*—Khoi Q. Ta
*Attorney, Agent, or Firm*—Birch, Stewart, Kolasch & Birch

[57] ABSTRACT

A vehicle power transmission apparatus is provided for maintaining a constant power output when driving a vehicle regardless of the change in the frictional force of the belt in a belt type stepless speed change device. A belt type stepless speed change device is used with a vehicle driving, prime motor on board a vehicle. The apparatus provides a flat characteristic segment covering at least a part of the power output characteristic relative to the revolutions of the vehicle driving prime motor. The apparatus allows the vehicle to be driven by a constant power output within the segment of the flat power output characteristic regardless of changes in the frictional force of the belt in the belt type stepless speed change device.

24 Claims, 6 Drawing Sheets

VEHICLE POWER TRANSMISSION APPARATUS

BACKGROUND OF THE INVENTION

1. Field of the Invention

The present invention relates to a vehicle power transmission apparatus for use with a belt type stepless speed change device to transmit the torque of an electrically activated driving source to the driven side of the vehicle. The apparatus minimizing the changes in the variable speed characteristic which are caused primarily by the varying frictional resistance due to time induced belt wear. Thus, the comfort of the passenger(s) is maintained on board a smoothly operating vehicle.

2. Description of Background Art

Of the vehicles driven by an internal combustion engine or by an electric motor, some employ a belt type stepless speed change device as the automatic transmission for smoothly transmitting the torque of the driving source to the driven side of the vehicle. For example, Japanese Patent Laid-Open No. 3-128789 discloses an electrically driven vehicle including a belt type stepless speed change device. This stepless speed change device has an endless belt with a trapezoid cross section engaged between the driving pulley mounted on the motor output shaft on the one hand, and the driven pulley furnished on the reduction gear input shaft on the other.

When engaged frictionally, the endless belt of the above cross-sectional shape transmits the torque across the driving pulley to the driven pulley. Over time, the coefficient of friction of the pulleys varies due primarily to secular change. In particular, the intermediate speed characteristic between high and low speeds is liable to change. The changed intermediate speed characteristic deteriorates the quality of the transmission apparatus or causes the performance thereof to become erratic. The irregularities often detract from the comfort of the passenger(s) on board the vehicle operating with the transmission apparatus in question.

SUMMARY AND OBJECTS OF THE INVENTION

It is an object of the present invention to provide a vehicle power transmission apparatus comprising a belt type stepless speed change device for use on board a vehicle wherein the apparatus maintains the power output constant when driving the vehicle regardless of the change in the frictional force of the belt so that the comfort of the passenger(s) on board the vehicle is maintained.

According to one embodiment thereof, there is provided a vehicle power transmission apparatus comprising a belt type stepless speed change device for use with a vehicle driving prime motor on board a vehicle, the apparatus provides a flat characteristic segment covering at least a part of the power output characteristic relative to the revolutions of the vehicle driving prime motor.

In a preferred structure according to the invention, the vehicle power transmission apparatus provides a high and a low gear ratio and has a variable speed characteristic such as to keep the revolutions of the vehicle driving prime motor substantially constant between the high and the low gear ratios with respect to the speed of the vehicle.

In a further preferred structure according to the invention, the vehicle power transmission apparatus utilizes an electric motor as the vehicle driving prime motor.

In a yet further preferred structure according to the invention, the flat characteristic segment provided by the vehicle power transmission apparatus is the variable speed characteristic region or the maximum vehicle speed region of the belt type stepless speed change device.

Because the vehicle power transmission apparatus according to the invention provides a flat characteristic segment covering at least a part of the power output characteristic relative to the revolutions of the vehicle driving prime motor, the apparatus allows the vehicle to be driven by a constant shaft revolution output of the vehicle driving prime motor within the flat segment of the power output characteristic regardless of the frictional force of the belt being varied over time in the belt type stepless speed change device.

When the frictional force of the belt in the belt type stepless speed change device is varied over time, the revolutions of the driven vehicle, the prime motor running in a stepless fashion is changed, correspondingly. Despite the changes of the revolutions, the invention allows the vehicle to be driven by the constant power output within the range of revolutions of the driving vehicle, prime motor, the speed of the latter being varied in a stepless manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6($b$) and 6($c$) are graphs showing vehicle speed vs. entire vehicle output;

FIG. 6($d$) is a graph showing vehicle speed vs. efficiency; and

DESCRIPTION OF THE PREFERRED EMBODIMENT

Preferred embodiments of the vehicle power transmission apparatus according to the invention will now be described in connection with an electrically driven motorcycle.

Figure 1:
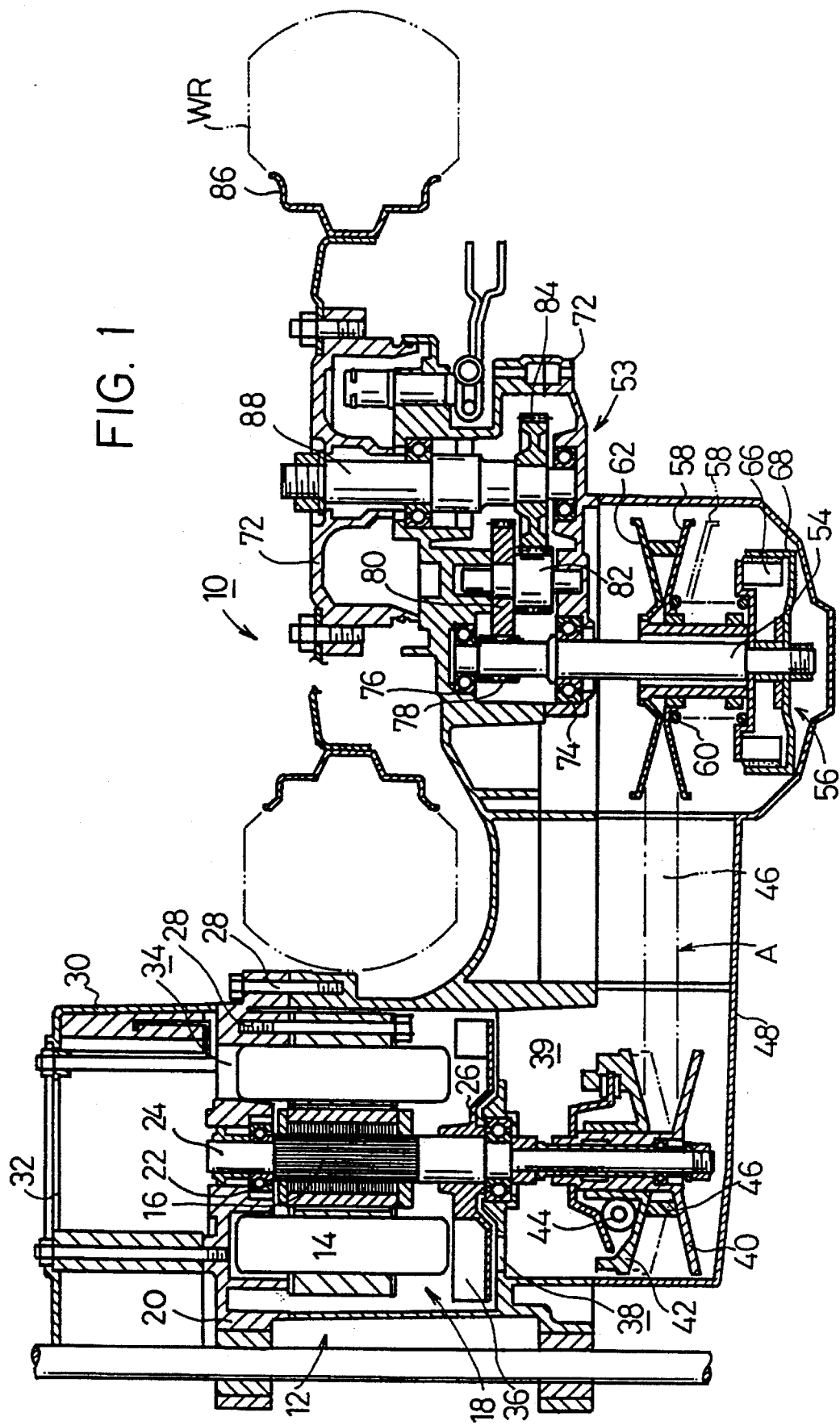
FIG. 1 is a cross-sectional view of a first embodiment of the invention.
Figure 2:
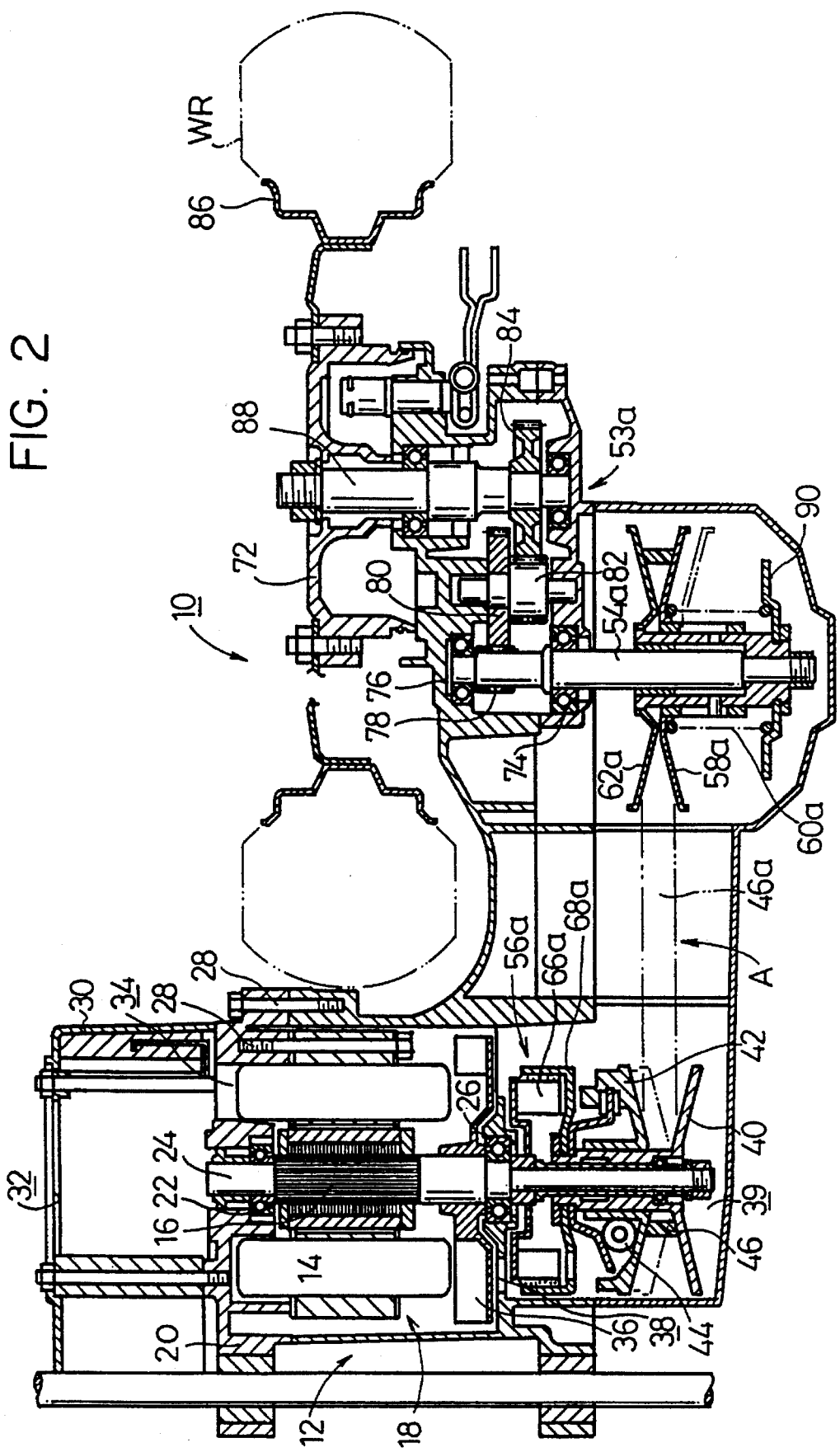
FIG. 2 is a cross-sectional view of a second embodiment of the invention.

FIGS. 1 and 2 are cross-sectional views of mechanical structures embodying the invention in conjunction with the electrically driven motorcycle. FIG. 1 is a cross-sectional view of a first embodiment wherein the clutch mechanism is provided on the driven side. FIG. 2 is a cross-sectional view of a second embodiment wherein the clutch mechanism is furnished on the driving side.

As illustrated in FIG. 1, the electrically driven motorcycle includes a driving section 10. A motor housing 12 is a casting made from a light metal. A motor 18 including a stator 14 and a rotor 16 is provided inside the motor housing 12. One axial end of the motor 18 is closed by a first lid member 20. The first lid member 20 supports rotatably a rotating shaft 24 of the motor 18 with bearings 22. The other end of the motor housing 12 supports the rotating shaft 24 with bearings 26. The motor housing 12 and the first lid member 20 are secured with bolts 28.

The entire opening of the first lid member 20 is closed by a first cover member 30. A cooling hole 32 is provided through the axial center of the first cover member 30. The cooling hole 32 is connected with the interior of the motor housing 12 via a hole 34 formed in the first lid member 20. A centrifugal cooling fan 36 is provided near the bearings 26 at one end of the rotating shaft 24 on which the rotor 14 is mounted. In operation, the cooling air generated by the centrifugal cooling fan 36 is sent through a hole 38 to a chamber 39 formed by a second cover member 48, to be described later.

The other end of the rotating shaft 24 is equipped axially with a first fixed pulley half 40 and a first moving pulley half 42, the two halves being secured in a fixed manner. When a centrifugal weight 44 is moved outward by its centrifugal force, the first moving pulley half 42 shifts its center of gravity in the radial and outward direction. A pulley belt 46 having a trapezoid shaped cross section is held taut across the first fixed pulley half 40 to the second moving, pulley half 42 over their tapered surfaces. In this way, the pulley belt 46 is also engaged across a second fixed pulley half 62 and a second moving pulley half 58 held on the rear wheel side by the second cover member 48, to be described later.

On the driven side, a reduction gear 53 includes a gear train construction. A centrifugal clutch 56 is fixedly attached to the input shaft 54 of the reduction gear 53. The second moving pulley half 58 is attached to the centrifugal clutch 56 in an axial and displaceable manner. In this setup, a coil spring 60 is disposed interposingly between the moving pulley half 58 and the centrifugal clutch 56. The coil spring 60 keeps pushing the moving pulley half 58 toward the second fixed pulley half 62 engaged detachably with the input shaft 54.

As illustrated in FIG. 1, the centrifugal clutch 56 has a clutch inner 66 and a clutch outer 68. The clutch inner 66 and clutch outer 68 engage with each other reflecting the current revolutions to transmit the torque thereof to the input shaft 54.

A second lid member 72 is fixedly attached to a section of the motor housing 12 in which the reduction gear 53 is contained. The input shaft 54 is rotatably supported by bearings 74 of the second lid member 72 and by bearings 76 held in the motor housing 12. Inside the motor housing 12, an input gear 78 is engaged with the input shaft 54. The input gear 78 is also engaged with an intermediate gear 80 of a large diameter. An intermediate gear 82 aligned axially with the intermediate gear 80 is engaged with an output gear 84. One end of the output gear 84 is fixedly engaged with an output shaft 88 that supports rotatably the rear wheel rim 86 of the electrically driven motorcycle. In FIG. 1, reference characters WR indicate the rear tire secured to the rear wheel of the vehicle.

FIG. 2 is a cross-sectional view of the second embodiment of the invention wherein those parts that are functionally identical to those already described in connection with the first embodiment are designated by the same reference characters, and any detailed descriptions thereof will be omitted.

As shown in FIG. 2, the second embodiment differs from the first is that a centrifugal clutch 56a corresponding to the centrifugal clutch 56 in the first embodiment is located on the driving side. In the second embodiment, the centrifugal clutch 56a is axially located outside the bearings 26. The centrifugal clutch 56a has a clutch inner 66a and a clutch outer 68a. The cooling air generated by the revolutions of the centrifugal cooling fan 36 is sent via a hole 38 to a chamber 39 accommodating the centrifugal clutch 56a. On the rear wheel side, a bearing member 90 is fixedly attached to the input shaft 54 of a reduction gear 53a. A moving pulley half 58a is attached to the bearing member 90 in an axial and displaceable manner. In this setup, a coil spring 60a is disposed interposingly between the moving pulley half 58a and the bearing member 90. The coil spring 60a keeps pushing the moving pulley half 58a toward a fixed pulley half 62a fixedly attached to the input shaft 54a. Thus, one end of a pulley belt 46a is held taut across the moving pulley half 58a to the fixed pulley half 62a.

In FIG. 2, the fixed pulley half 40, moving pulley half 42, centrifugal weight 44 and pulley belt 46 constitute a belt type stepless speed change device (hereinafter called the belt converter).

The driving section 10 of the motorcycle in the first and the second embodiments described above operates as follows. By turning a throttle lever, not shown, the motor 18 rotates. As the shaft 24 rotates, the resulting torque rotates the first fixed pulley half 40 and the first moving pulley half 42. If the rotating speed is sufficiently high, the centrifugal weight 44 moves outward in the radial direction. This causes the moving pulley half 42 to shift in the direction shown by two-dot chain line relative to the first fixed pulley half 40. On the side of the reduction gear 53 (53a), the moving pulley half 58 (58a) shifts in the direction indicated by two-dot chain line against the recoiling force of the coil spring 60 (60a). That is, on the side of the reduction gear 53 (53a), the moving pulley half 58 (58a) moves away from the second fixed pulley half 62 (62a).

When the second fixed pulley half 62 (62a) and the moving pulley half 58 (58a) rotate while shifting axially under the torque of the pulley belt 46 (46a), the input shaft 54 (54a) rotates correspondingly. The revolutions are reduced as the gear ratio is changed through the input gear 78, intermediate gear 80, intermediate gear 82 and output gear 84, in that order. The resulting revolutions are transmitted by the output shaft 88 to the rear wheel WR. Thus the rear wheel rotates assuming the role of the driving wheel to move forward the electrically driven motorcycle in cooperation with the front wheel, not shown.

Below is a description of how the motor 18 runs and how it is controlled when driven. The motor 18 is a DC brushless motor comprising a rotor 16, a stator 14, magnets 17, a rotor position detector 21 and a revolution detector 23. The rotor 16 has a total of four N and S permanent magnets 13N and 13S arranged alternately around the outer circumference of a stator core secured to the rotating shaft 24 of the motor 18.

The stator 14 has stator coils 15U, 15V and 15W arranged in a Y-connection. The magnets 17 are N and S pole pieces which correspond respectively to the permanent magnets 13N and 13S and which are also secured alternately around the outer circumference of the rotating shaft 24. The rotor position detector 21 is composed of three Hall elements and is located opposite to the magnet assembly. The revolution detector 23, made of FG's for detecting the revolutions of the motor 18, is attached to the rotating shaft 24.

Figure 3:
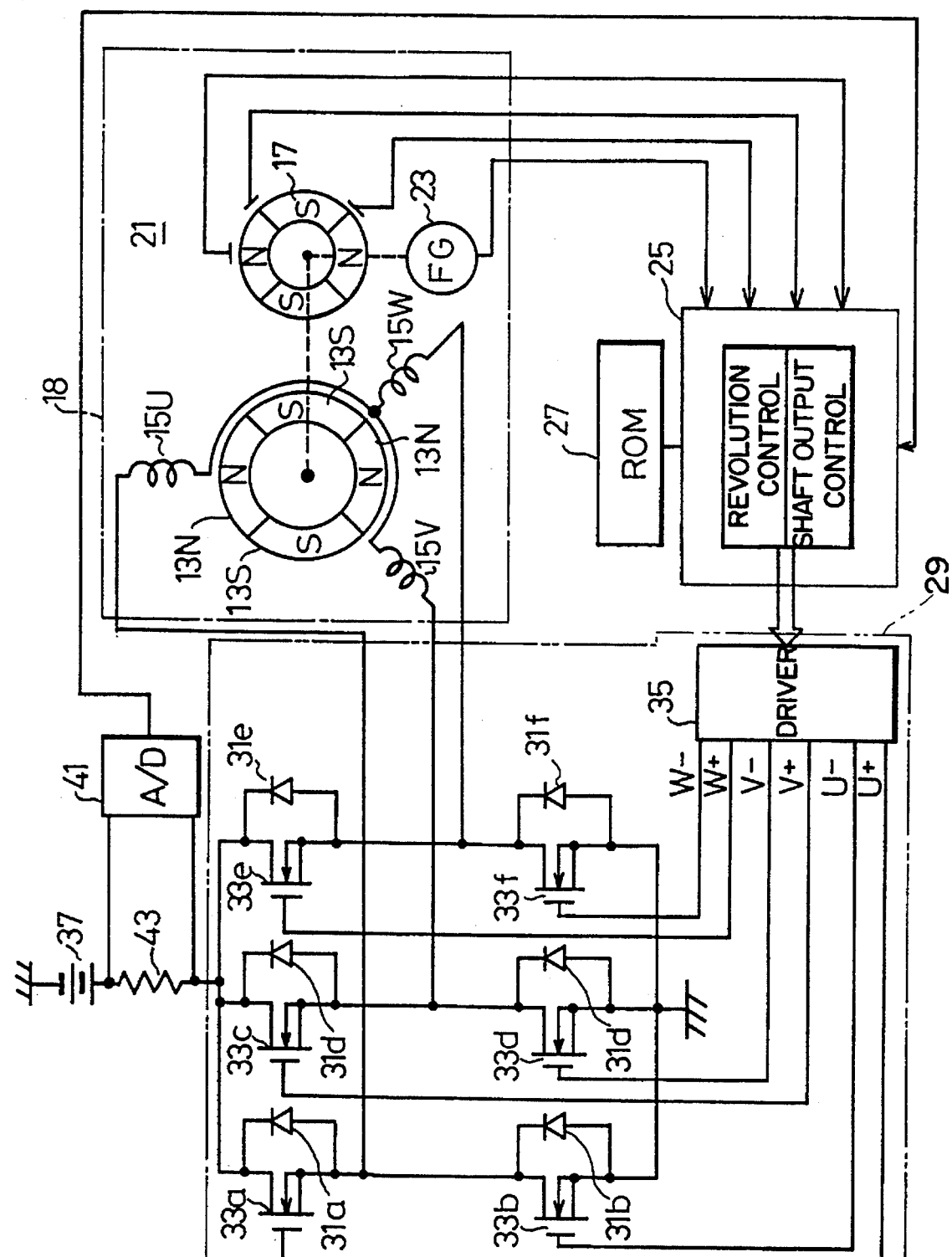
FIG. 3 is a circuit diagram of a typical motor control system for use with the two embodiments of the invention.

FIG. 3 is a circuit diagram of a motor control system for use with the embodiments of the present invention. For control over the motor 18, the invention provides a ROM 27 containing a motor revolutions vs. power output characteristic table, the characteristic is plotted by solid line in FIG. 4, and a controller 25 having a microcomputer that works in cooperation with the ROM 27. The controller 25 receives four kinds of signals: the output signal from the rotor position detector 21 as it detects the permanent magnet position of the rotor 16 resulting from the rotation of the motor 18; the output from a potentiometer connected with an accelerator grip which in turn is coupled to a motorcycle handlebar, not shown; the output signal from the revolution detector 23; and the output from an A/D converter 41 that converts to digital data the voltage reductions across a resistor 43, to be described later, the reductions being attributed to the current flowing through the rotor coils of the motor 18.

Between the controller 25 and the motor 18 is a switching circuit 29 that includes a driver 35 for amplifying the output of the controller 25. The switching circuit 29 also contains serially connected field effect transistors (FET's) 33a and 33b, 33c and 33d, and 33e and 33f. In turn, these FET's are connected in parallel between ground and the resistor 43 whose one end is connected to a battery 37. The connecting point between source of the FET 33a and drain of the FET 33b is connected to the stator coil 15U; the connecting point between source of the FET 33c and drain of the FET 33d is connected to the stator coil 15V; and the connecting point between source of the FET 33e and drain of the FET 33f is connected to the stator coil 15W. The output of the driver 35 drives the FET's 33a through 33f selectively to energize any one of the stator coils 15U, 15V and 15W.

In the above setup, the current flowing from the battery 37 to the stator coils 15U, 15V and 15W is allowed to flow into the resistor 43 for conversion to voltage. Voltage reductions occurring across the resistor 43 are fed to the A/D converter 41 for conversion to digital data. The digital data is then sent to the controller 25. The FET's 33a through 33f are connected respectively with diodes 31a through 31f in parallel. The functions of the controller 25 include those of revolution control and power output control.

In the motor control system of the above constitution, the controller 25 generates pulses for switching the current to any one of the phases of the stator coils 15U, 15V and 15W in accordance with the output signal from the rotor position detector 21. The detector 21 detects the magnetic pole position of the rotor 16 driven by the motor 18. A deviation is calculated between the output of the potentiometer connected to the accelerator grip and the output signal from the revolution counter 23. On the basis of the deviation thus calculated, the duty ratio of a PWM signal is calculated. The PWM signal chops the pulses for switching the current to any one of the stator coils 15U, 15V and 15W. The chopped pulses are output by the controller 25 to the driver 35 for the respective stator coils.

Figure 5:
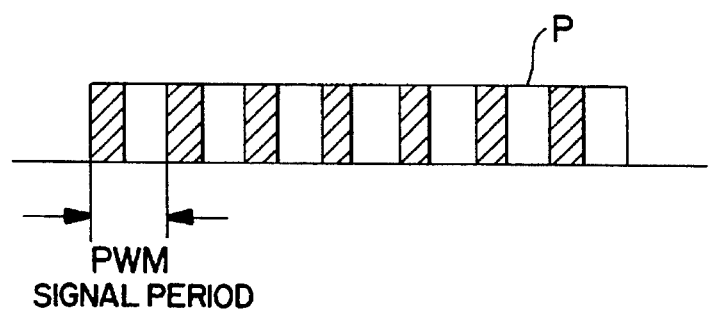
FIG. 5 is a view describing how a motor driving signal is constituted in connection with the invention.

The period of the PWM signal is set to be very much shorter than the pulse width of the pulses for switching the current to the stator coils 15U, 15V and 15W. FIG. 5 is a schematic view showing one stator coil phase of the chopped pulses. In FIG. 5, reference character P indicates the pulses for switching the current to the stator coils, and the shaded portions represent regions in which the current is allowed to flow.

The pulses chopped by the PWM signal are amplified for each phase by the driver 35. The amplified pulses turn on or off the corresponding FET's for control of the rotor revolutions of the motor 18 so that the deviation between the potentiometer output and the output signal from the revolution detector 23 will become zero.

Meanwhile, the controller 25 calculates the power output of the motor 18 in accordance with the output of the revolution detector 23 as well as with the digital data converted by the A/D converter 41. The calculations are performed on the ground that the power output is based on the product of the current flowing through the motor 18 and the revolutions thereof.

Figure 4:
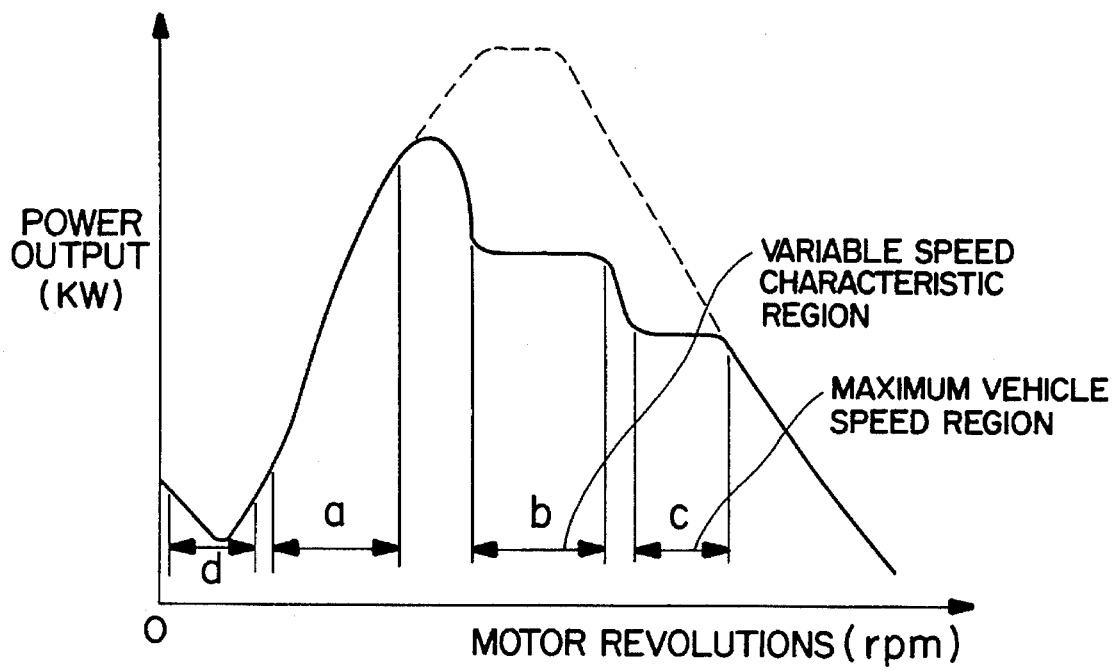
FIG. 4 is a view illustrating typical motor revolutions vs. power output characteristic in connection with the present invention.

The motor revolutions vs. power output characteristic table in the ROM 27 is referenced according to the rotor revolutions of the motor 18 detected by the revolution detector 23. This causes the power output corresponding to the rotor revolutions of the motor 18 to be read from the ROM 27. A comparison of the read-out power output with the calculated power output is followed by control of the duty ratio of the PWM signal in such a manner as to bring the deviation between the two kinds of output to zero. The PWM signal with its duty ratio thus controlled chops the pulses P. The chopped pulses are amplified by the driver 35. The amplified output of the driver 35 turns on or off the FET's 33a through 33f, selectively. Accordingly, the motor 18 is driven for power output based on the motor revolutions vs. power output characteristic (at full load), the characteristic having segments a, b, c, d and a region beyond the three segments, as shown in FIG. 4. In the segment d, the motor is just beginning to rotate the output shaft. In the segment a, the output torque for increasing the power output in the low revolution region is constant. In the segment b, the power output remains constant past its peak. In the segment c, the power output further remains constant. In the region beyond the three segments is a high revolution region where the power output drops as the revolutions increase.

In FIG. 4, the broken line represents a motor revolutions vs. power output characteristic of the motor 18 in effect when the above-described chopping control is not provided.

The rotor revolutions of the motor 18 are transmitted to a belt converter A (i.e., belt type stepless speed change device). In turn, the belt converter A drives the rear wheel WR via the reduction gear 53 (53a).

Figure 6A:
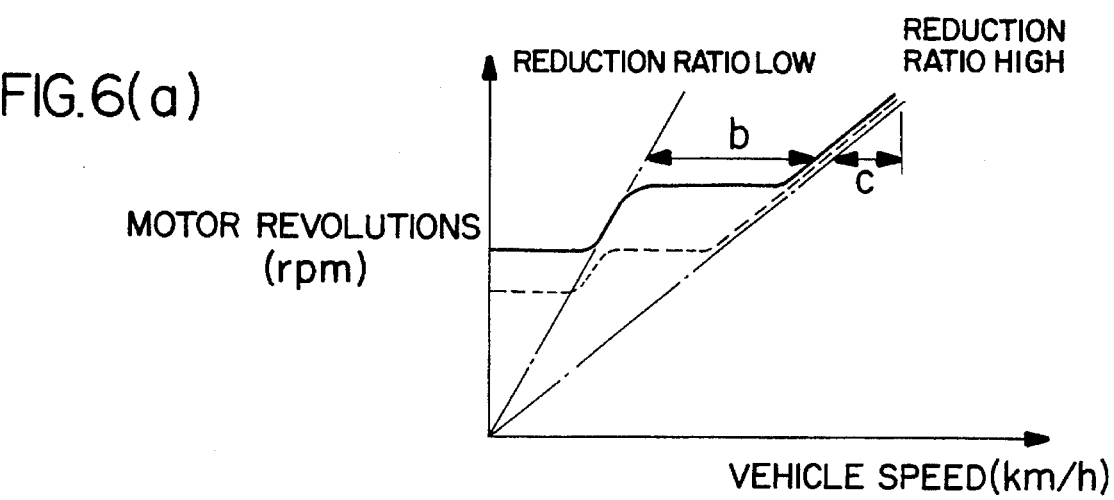
FIG. 6($a$) is a graph showing a typical vehicle speed vs. motor revolutions.

The belt converter A is set to the characteristic of the broken line in FIG. 6(a), the characteristic being that of vehicle speeds vs. motor revolutions in the initial state where the frictional force of the pulley belt 46 (46a) has yet to be diminished. According to the characteristic thus established, the belt converter A works as follows. When the revolutions of the rotor 16 in the motor 18 reach a predetermined number of revolutions, the centrifugal clutch 56 (56a) is engaged. The vehicle speed increases in keeping with the rotor revolutions of the motor 18 based on the low reduction ratio of the belt converter A. The low reduction ratio is the ratio of the driving pulley to the driven pulley in terms of radius, the two pulleys being spanned with the pulley belt 46 (46a) wound thereon. Illustratively, speed change starts at a predetermined number of revolutions in the vicinity of the number of revolutions for yielding maximum efficiency. Speed change continues in a stepless manner with the established number of revolutions kept unchanged up to a vehicle speed that is commensurate with the high reduction ratio. Thereafter, the vehicle speed is raised along the high reduction ratio curve.

It should be noted that the segment b of the motor revolutions vs. power output characteristic in FIG. 4 is established so that the revolutions changed in stepless fashion by the belt converter A will fall within the segment b of the vehicle speed vs. motor revolutions characteristic in FIG. 6(a). The segment b is called the variable speed characteristic region in which the variable speed characteristic occurs between the lowest and the highest ratios.

Generally, where the belt converter A is utilized, the frictional force between the pulley belt 46 (46a) on the one hand and the first fixed pulley half 40 and the second moving pulley half 42 on the other, and the frictional force between the pulley belt 46 (46a) on the one hand and the fixed pulley half 62 (62a) and moving pulley half 58 (58a) on the other, deteriorate over time. Even with the rotor revolutions of the motor 18 held constant, the revolutions of the rear wheel WR decrease. This makes it impossible for the vehicle to run at a constant speed. On the other hand, raising the rotor revolutions of the motor 18 generally leads to a drop in the power output, with the result that the vehicle cannot run on the same output.

By contrast, according to the invention as embodied above, there is provided a constant power output segment covering at least part of the whole span of rotor revolutions of the motor 18 (i.e., within variable speed characteristic region), the rotor revolutions being in effect when the vehicle illustratively travels up slopes. An example of the constant power output segment is the segment b of the motor revolutions vs. power output characteristic shown in FIG. 4. When a drop occurs in the frictional force between the driving and driven pulleys on the one hand and the pulley belt 46 (46a) on the other in the belt converter A, a change takes place from the vehicle speed vs. motor revolutions characteristic indicated by the broken line in FIG. 6(a) to that indicated by the solid line in the same figure. However, the rear wheel WR is driven by the constant power output within the segment b of the vehicle speed vs. motor revolutions characteristic represented by solid line in FIG. 6(a).

Because the vehicle in acceleration is driven by the constant power output within the segment b of the vehicle speed vs. motor revolutions characteristic in FIG. 6(a), any reductions from the initial value are minimized in the frictional force between the driving and driven pulleys on the one hand and the pulley belt 46 (46a) on the other, the reductions being attributed to secular change and/or irregularities in mass production. That in turn minimizes any adverse effects on the power characteristic of the vehicle. Since the power output is kept constant within the segment b, drops in the frictional force between the driving and driven pulleys on the one hand and the pulley belt 46 (46a) on the other seldom affect the vehicle's capability to travel up slopes.

In the preferred embodiments, the reduction ratio of the belt converter A rarely varies with the reduction in the frictional force between the driving and driven pulleys on the one hand and the pulley belt 46 (46a) on the other within a region of approximately maximum revolutions (e.g., segment c) beyond the segment b of the motor revolutions vs. power output characteristic shown in FIG. 4. As illustrated in FIG. 4, the segment c is the region where the power output remains constant with respect to the motor revolutions vs power output characteristic. This makes it possible to drive the vehicle at maximum speed despite reductions in the frictional force between the driving and driven pulleys on the one hand and the pulley belt 46 (46a) on the other. It is also possible to maintain the maximum speed regardless of power losses resulting from the wear of the gear elements constituting the reduction gear 53 (53a) between the driven pulley and the rear wheel WR. In that sense, the segment c is called the maximum vehicle speed region. This is the region where the maximum vehicle speed is achieved within the variable speed characteristic of the highest ratio.

The segment c of the vehicle speed vs. motor revolutions characteristic in FIG. 6(a) corresponds to the segment c of the motor revolutions vs. power output characteristic in FIG. 4.

Figure 6B:
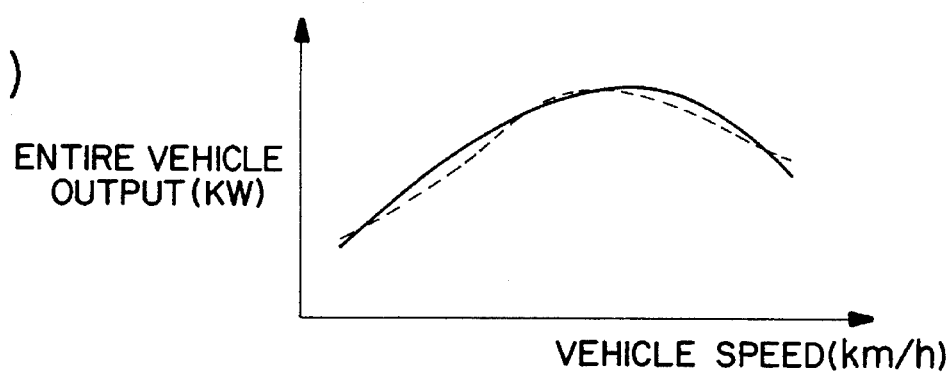

Furthermore, where the segments b and c of constant power output are provided in the motor revolutions vs power output characteristic of FIG. 4, reductions in the frictional force between the driving and driven pulleys on the one hand and the pulley belt 46 (46a) on the other scarcely affect the vehicle speed vs. entire vehicle output characteristic, as depicted in FIG. 6(b). In FIG. 6(b), the broken line indicates the initial state in which no frictional force reduction has occurred, and the solid line stands for a state where the frictional force has dropped.

Figure 6C:
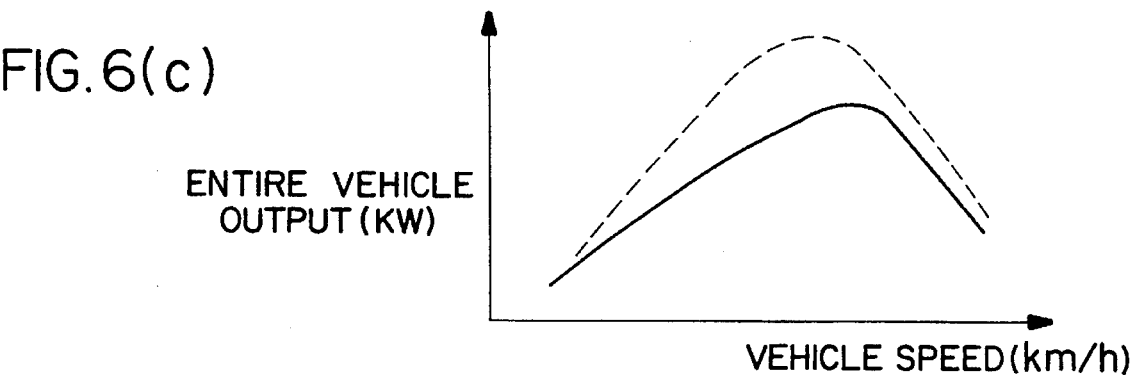
Figure 6D:
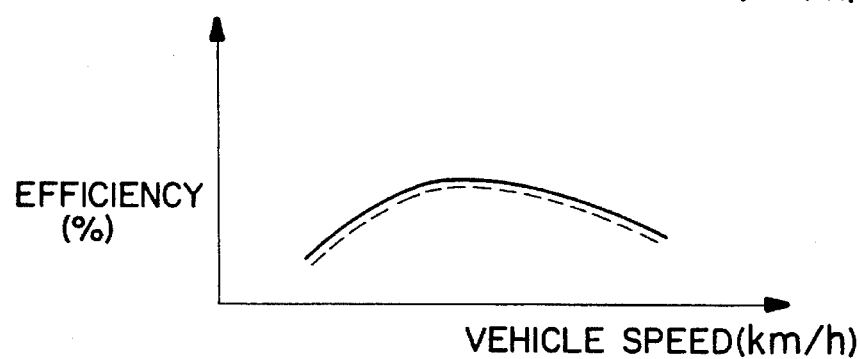

If no constant power output segment is provided in the motor revolutions vs. power output characteristic, as in the case indicated by broken line in FIG. 4, reductions in the frictional force between the driving and driven pulleys on the one hand and the pulley belt 46 (46a) on the other significantly affect the vehicle speed vs. entire vehicle output characteristic, as shown in FIG. 6(c). When the segments b and c of constant power output are provided as illustrated in FIG. 4, reductions in the frictional force between the driving and driven pulleys on the one hand and the pulley belt 46 (46a) on the other seldom affect the vehicle speed vs. efficiency characteristic, as shown in FIG. 6(d).

In the centrifugal clutch 56 (56a), secular change brings about reductions in the frictional force between clutch inner 66 (66a) and clutch outer 68 (68a). In turn, the reductions cause the clutch capacity to drop from a capacity upon initial friction indicated by broken line down to a capacity f shown by solid line. However, within the region ranging from the clutch capacity g to the clutch capacity f, the torque of the motor 18 remains constant as shown by solid line e in the motor revolutions vs. driving torque characteristic of FIG. 7, the constant torque region corresponding to the segment a of the motor revolutions vs. power output characteristic in FIG. 4. This allows the centrifugal clutch 56 (56a) to be driven at a constant torque level irrespective of the frictional force being at its initial value or having degraded over time, whereby constant torque transmission is ensured by the centrifugal clutch 56 (56a). Thus the driving torque stays constant and the vehicle's capacity to move up slopes is not adversely affected.

Figure 7:
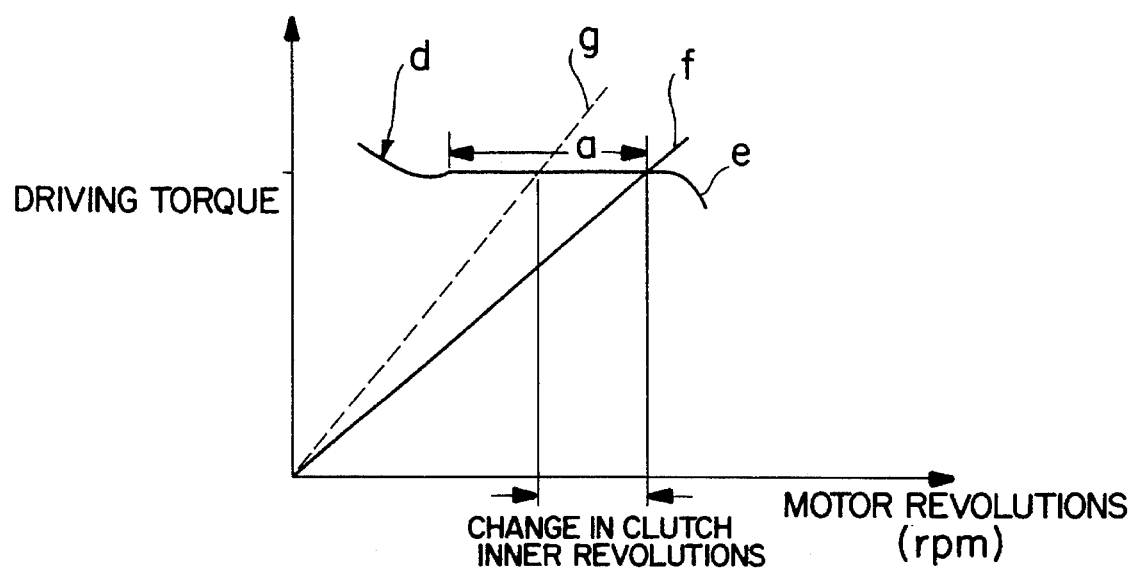
FIG. 7 is a graph depicting typical motor revolutions vs. driving torque characteristic in connection with the present invention.

The segment a of the motor revolutions vs. driving torque characteristic in FIG. 7 corresponds to the segment a of the motor revolutions vs. power output characteristic of FIG. 4.

In a torque segment d of the motor revolutions vs. power output characteristic in FIG. 4, the torque exceeds that in the constant torque segment a. This torque segment d is matched with the segment d provided in the motor revolutions vs. driving torque characteristic of FIG. 7. As a result, the vehicle can start in a powerful manner at a torque level higher than that of the constant torque segment a.

Conventionally, belt converters using an internal combustion engine as their driving source were incapable of keeping the output torque of the engine constant with respect to the output shaft revolutions thereof. Moreover, this type of belt converter was liable to develop changes in revolutions. For these reasons, such conventional belt converters have incorporated a centrifugal clutch 56 (56a) wherein the clutch inner 66 (66a) and clutch outer 68 (68a) engage with each other typically at about 3,000 rpm. This means that power transmission is apt to be irregular under the 3,000 rpm threshold.

In the second embodiment, by contrast, the output torque of the motor 18 is held constant-relative to the revolutions thereof as in the segment a of the motor revolutions vs. power output characteristic in FIG. 4. With little fluctuation in the number of revolutions, the centrifugal clutch 56 may be engaged illustratively at revolutions as low as 500 rpm. As described above, differences in clutch engaging revolutions do no prevent the motor 18 from yielding constant torque at low revolutions.

In the second embodiment, the centrifugal clutch 56a is located on the side of the motor 18 away from the belt converter A. This arrangement involves less loads connected to the motor 18 in an idle state when the centrifugal clutch is disengaged as compared to the setup wherein the relative positions of the centrifugal clutch 56a and belt converter A are reversed. Furthermore, the above arrangement lowers the number of revolutions at which to engage the centrifugal clutch 56a regardless of the reduction ratio adopted by the belt converter A.

Because the driving pulley rotates faster than the driven pulley in the belt converter A, the centrifugal clutch 56a may be manufactured to be smaller in diameter. One benefit of this feature is a smaller and more lightweight centrifugal clutch 56a. Since the centrifugal clutch 56a is driven direct by the motor 18, the number of revolutions necessary to engage the clutch is increased. This is another factor contributing to making the centrifugal clutch 56a smaller and lighter than before. As a result, the motor 18 as employed by the invention consumes less power as compared to prior art devices.

As described, the vehicle power transmission apparatus according to the invention comprises a belt type stepless speed change device for use with a vehicle driving prime motor on board a vehicle. The apparatus provides a flat characteristic segment covering at least a part of the power output characteristic relative to the revolutions of the vehicle driving prime motor. The invention when embodied allows the vehicle to be driven by constant power output within the segment of the flat power output characteristic regardless of secular changes in the frictional force of the belt in the belt type stepless speed change device. This results in little adverse effect on the variable power transmission characteristic based on the frictional force of the belt in the belt type stepless speed change device. A major benefit of the invention is that little deterioration occurs over time in the power transmission characteristic of a used vehicle as compared with the initial state of the newly manufactured vehicle.

Another benefit of the invention is that even if secular changes in the frictional force of the belt in the belt type stepless speed change device alter the number of revolutions of the vehicle driving prime motor whose speed is varied in stepless fashion, the vehicle is still driven by constant power output within the range of revolutions of the prime motor.

A further benefit of the invention is that if an electric motor assumes the role of the vehicle driving prime motor, it is easy to obtain a segment of the flat, power output characteristic with respect to the number of revolutions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle power transmission apparatus comprising:
   a belt type stepless speed change device for use with a vehicle for transmitting a driving force from a prime motor to a driven wheel operatively connected to said vehicle; and
   a control circuit operatively connected to said prime motor, said control circuit including means for detecting the rotational speed of an output shaft of said prime motor and for detecting output power of said prime motor, storage means for storing a predetermined characteristic table based on motor revolutions vs. power output and comparison means for comparing said output power with power output determined by said predetermined characteristic table in said storage means in accordance with rotational speed of an output shaft of said prime motor for producing modulated pulses for controlling said prime motor for providing a discrete substantially constant flat power characteristic segment covering at least a portion of the power output relative to the revolutions of said prime motor.

2. The vehicle power transmission apparatus according to claim 1, wherein said transmission provides a high and a low gear ratio having a variable speed characteristic and said control circuit maintains the revolutions of said vehicle driving prime motor substantially constant between said high and said low gear ratios with respect to the speed of said vehicle.

3. The vehicle power transmission apparatus according to claim 1, wherein said vehicle driving prime motor is an electric motor.

4. The vehicle power transmission apparatus according to claim 2, wherein said vehicle driving prime motor is an electric motor.

5. The vehicle power transmission apparatus according to claim 1, wherein said control circuit maintains said discrete substantially constant flat power characteristic segment during a variable speed characteristic region of said belt type stepless speed change device.

6. The vehicle power transmission apparatus according to claim 1, wherein said control circuit maintains said discrete substantially constant flat power characteristic segment during a maximum vehicle speed region of said belt type stepless speed change device.

7. The vehicle power transmission apparatus according to claim 1, and further including a switching circuit having a driver operatively connected to said control circuit for supplying signals to a plurality of field effect transistors for selectively energizing stator coils of said prime motor.

8. The vehicle power transmission apparatus according to claim 7, and further a plurality of diodes operatively connected in parallel with corresponding field effect transistors for selectively energizing stator coils of said prime motor.

9. The vehicle power transmission apparatus according to claim 1, and further including a centrifugal clutch operatively connected to said output shaft of said prime motor for transmitting rotation therefrom through a driven belt to said vehicle power transmission.

10. The vehicle power transmission apparatus according to claim 9, and further including a pulley having two movable halves operatively connected to said output shaft of said prime motor for retaining said driven belt in a predetermined position.

11. The vehicle power transmission apparatus according to claim 1, and further including an input shaft operatively connected to a vehicle power transmission and a centrifugal clutch operatively connected to said input shaft, rotary motion being supplied from said prime motor through a driven belt to said input shaft of said vehicle power transmission.

12. The vehicle power transmission apparatus according to claim 11, and further including a pulley having two movable halves operatively connected to said input shaft of said vehicle power transmission for retaining said driven belt in a predetermined position.

13. A vehicle power transmission apparatus comprising:
a belt type stepless speed change device for use with a vehicle for providing a driving force from a prime motor to a driven wheel operatively connected to said vehicle; and
a control circuit operatively connected to said prime motor, said control circuit receiving a signal representative of rotational speed of an output shaft of said prime motor, a signal representative of a potentiometer operatively connected to an accelerator of the vehicle, a signal representative of a magnet positioning of a rotor of said prime motor and a signal representative of the current flowing through said rotor, said control circuit including means for determining output power of said prime motor, storage means for storing a predetermined characteristic table based on motor revolutions vs. power output and comparison means for comparing said output power with power output determined by said predetermined characteristic table in said storage means in accordance with rotational speed of an output shaft of said prime motor for producing modulated pulses for controlling said prime motor for providing a discrete substantially constant flat power characteristic segment covering at least a portion of the power output relative to the revolutions of said prime motor.

14. The vehicle power transmission apparatus according to claim 13, wherein said transmission provides a high and a low gear ratio having a variable speed characteristic and said control circuit maintains the revolutions of said vehicle driving prime motor substantially constant between said high and said low gear ratios with respect to the speed of said vehicle.

15. The vehicle power transmission apparatus according to claim 13, wherein said vehicle driving prime motor is an electric motor.

16. The vehicle power transmission apparatus according to claim 14, wherein said vehicle driving prime motor is an electric motor.

17. The vehicle power transmission apparatus according to claim 13, wherein said control circuit maintains said discrete substantially constant flat power characteristic segment during a variable speed characteristic region of said belt type stepless speed change device.

18. The vehicle power transmission apparatus according to claim 13, wherein said control circuit maintains said discrete substantially constant flat power characteristic segment during a maximum vehicle speed region of said belt type stepless speed change device.

19. The vehicle power transmission apparatus according to claim 13, and further including a switching circuit having a driver operatively connected to said control circuit for supplying signals to a plurality of field effect transistors for selectively energizing stator coils of said prime motor.

20. The vehicle power transmission apparatus according to claim 19, and further a plurality of diodes operatively connected in parallel with corresponding field effect transistors for selectively energizing stator coils of said prime motor.

21. The vehicle power transmission apparatus according to claim 13, and further including a centrifugal clutch operatively connected to said output shaft of said prime motor for transmitting rotation therefrom through a driven belt to said vehicle power transmission.

22. The vehicle power transmission apparatus according to claim 21, and further including a pulley having two movable halves operatively connected to said output shaft of same prime motor for retaining said driven belt in a predetermined position.

23. The vehicle power transmission apparatus according to claim 15, and further including an input shaft operatively connected to a vehicle power transmission and a centrifugal clutch operatively connected to said input shaft, rotary motion being supplied from said prime motor through a driven belt to said input shaft of said vehicle power transmission.

24. The vehicle power transmission apparatus according to claim 23, and further including a pulley having two movable halves operatively connected to said input shaft of said vehicle power transmission for retaining said driven belt in a predetermined position.

* * * * *